(12) United States Patent
Ashworth

(10) Patent No.: US 10,160,079 B2
(45) Date of Patent: Dec. 25, 2018

(54) PORTABLE RAIL SYSTEM FOR MOUNTING AN ENGRAVING DEVICE

(71) Applicant: Henry Ashworth, Bountiful, UT (US)

(72) Inventor: Henry Ashworth, Bountiful, UT (US)

(73) Assignee: RedArt Technologies LLC., Bountiful, UT (US)

( * ) Notice: Subject to any disclaimer, the term of this patent is extended or adjusted under 35 U.S.C. 154(b) by 0 days.

(21) Appl. No.: 15/683,604

(22) Filed: Aug. 22, 2017

(65) Prior Publication Data

US 2018/0050430 A1 Feb. 22, 2018

Related U.S. Application Data

(60) Provisional application No. 62/378,173, filed on Aug. 22, 2016.

(51) Int. Cl.
| | |
|---|---|
| *B23Q 9/00* | (2006.01) |
| *B44B 3/00* | (2006.01) |
| *B44B 1/06* | (2006.01) |
| *B44B 3/06* | (2006.01) |
| *B23Q 1/62* | (2006.01) |
| *B23Q 1/01* | (2006.01) |
| *B44B 3/02* | (2006.01) |
| *B24B 23/08* | (2006.01) |
| *B23C 1/20* | (2006.01) |

(52) U.S. Cl.
CPC ........... *B23Q 9/0042* (2013.01); *B23Q 1/012* (2013.01); *B23Q 1/621* (2013.01); *B44B 1/06* (2013.01); *B44B 3/006* (2013.01); *B44B 3/009* (2013.01); *B44B 3/02* (2013.01); *B44B 3/06* (2013.01); *B23C 1/20* (2013.01); *B24B 23/08* (2013.01); *Y10T 409/306384* (2015.01)

(58) Field of Classification Search
CPC .. B23Q 9/0014; B23Q 9/0007; B23Q 9/0042; Y10T 409/306216; Y10T 409/306384; B23C 1/20; B44B 3/02; B44B 3/006; B24B 23/08
USPC ................................ 403/346, 292, 293, 294
See application file for complete search history.

(56) References Cited

U.S. PATENT DOCUMENTS

| | | | | |
|---|---|---|---|---|
| 3,104,122 A | * | 9/1963 | Daniels ................... | E04B 1/585 248/219.4 |
| 3,819,198 A | * | 6/1974 | Groves .................... | A63C 5/02 280/603 |

(Continued)

FOREIGN PATENT DOCUMENTS

| | | | | |
|---|---|---|---|---|
| DE | 10327940 A1 | * | 1/2005 | ........... B23Q 9/0042 |
| EP | 0223214 A1 | * | 5/1987 | ............. B23Q 1/621 |

(Continued)

*Primary Examiner* — Daniel Howell
(74) *Attorney, Agent, or Firm* — Morriss O'Bryant Compagni

(57) ABSTRACT

A portable rail system for mounting an engraving device includes rails and crossbar members that are precisely joined, and include height adjustment devices for incrementally adjusting the height of the rail system relative to a work surface or contact surface, thus making the portable rail system capable of being assembled and disassembled at a work site to enable the use of an engraving device, such as a CNC router engraving systems, in situ, or on-site, rather than in a workshop. The portable rail system enables the use of a CNC router device or other engraving device on vertical surfaces.

18 Claims, 11 Drawing Sheets

(56) References Cited

U.S. PATENT DOCUMENTS

| | | | | |
|---|---|---|---|---|
| 4,105,055 A * | 8/1978 | Brenta | ............... | B23D 57/0092 |
| | | | | 108/13 |
| 4,184,300 A * | 1/1980 | Deschamps | ............... | E04C 2/40 |
| | | | | 403/13 |
| 4,189,268 A * | 2/1980 | Hackman | .................. | B23C 1/20 |
| | | | | 114/222 |
| 4,928,391 A * | 5/1990 | Higgins | ............... | B23Q 9/0014 |
| | | | | 30/293 |
| 4,995,277 A * | 2/1991 | Yanagisawa | ......... | B23Q 1/4809 |
| | | | | 248/657 |
| 5,697,413 A * | 12/1997 | Fuller | .................... | B23Q 33/00 |
| | | | | 144/135.2 |
| 6,129,489 A * | 10/2000 | Linderholm | ....... | B23K 37/0217 |
| | | | | 408/76 |
| 6,926,094 B2 * | 8/2005 | Arntson | .................. | B23B 39/18 |
| | | | | 173/31 |
| 9,174,286 B1 * | 11/2015 | Smith | ....................... | B23C 1/20 |
| 2010/0316458 A1 * | 12/2010 | Lindgren | ................ | B29C 73/10 |
| | | | | 409/79 |
| 2017/0057031 A1 * | 3/2017 | Li | .......................... | B23Q 1/017 |

FOREIGN PATENT DOCUMENTS

| | | | | |
|---|---|---|---|---|
| WO | WO 2008104266 A1 * | 9/2008 | ............. | B23Q 1/621 |
| WO | WO 2010003847 A2 * | 1/2010 | ............... | B23Q 1/28 |

\* cited by examiner

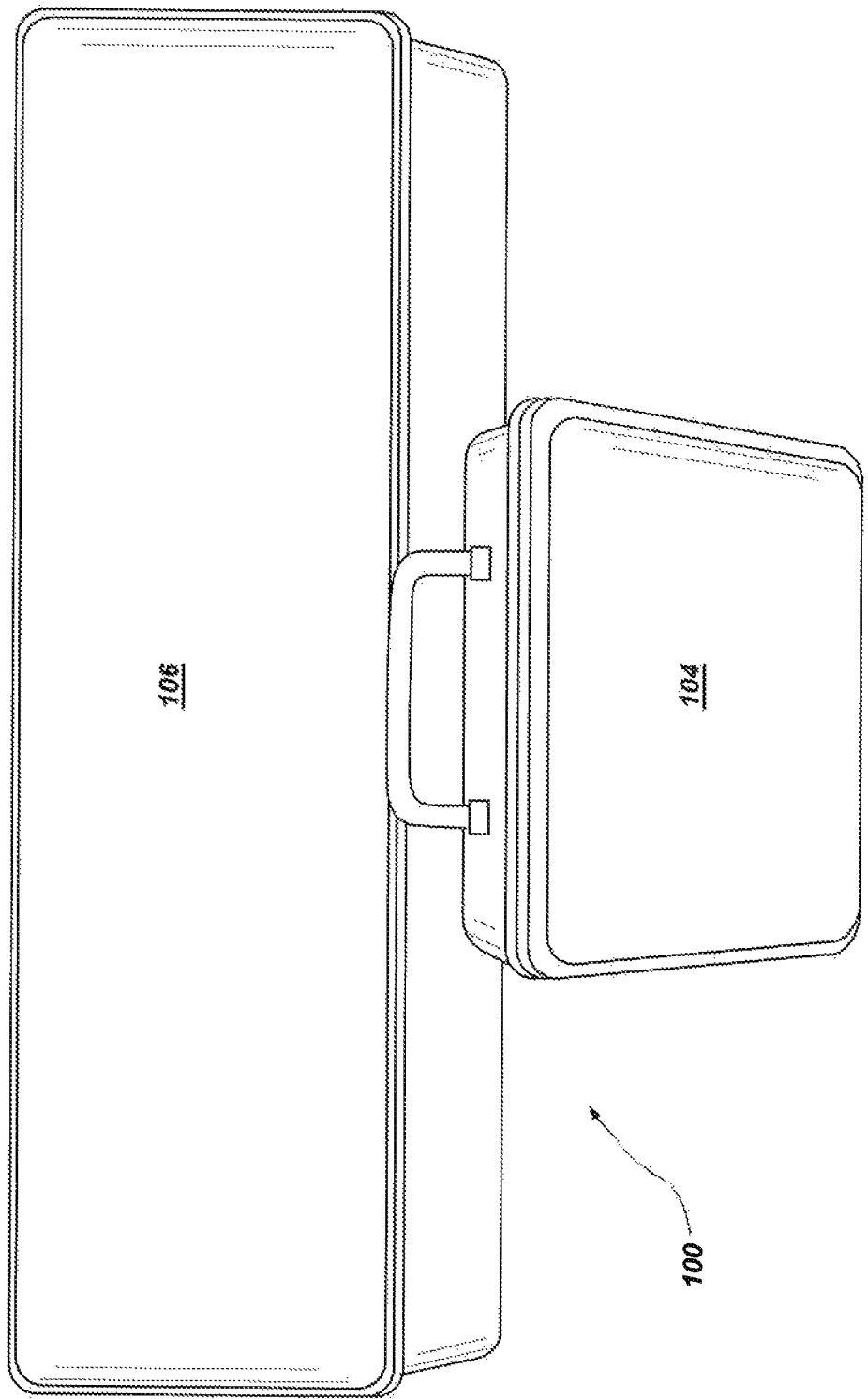

PORTABLE RAIL SYSTEM FOR MOUNTING AN ENGRAVING DEVICE

TECHNICAL FIELD

This disclosure relates in general to engraving systems that are used to engrave hard materials, and, in particular, to a portable rail or frame system for mounting an engraving device thereto for use in engraving hard materials in situ.

BACKGROUND OF THE DISCLOSURE

Engraving systems for use in engraving hard materials, such as stone, wood, hardened plastics, etc., are known. Such systems are commonly referred to as CNC (computer numerical control) router systems and generally comprise a CNC router that is secured to a gantry which slidingly moves along a supporting framework that is elevated above a horizontal work surface. The conventional form of such assemblies comprises a work table having a horizontal flat surface on which is placed a sheet or slab of hardened material. The supporting framework is positioned in elevation above the workpiece and supports a slidable gantry to which the CNC router is connected.

While conventional CNC routing systems are useful where the hardened material or workpiece can be brought to a shop for engraving, such systems do not address all situations in which a hardened surface is required to be engraved. Specifically, it may be desirable to engrave a hardened material that is permanently situated, such as at a construction site, and which cannot be transported to a work table for being worked on in a horizontal orientation. For example, a retaining wall that has been constructed as part of a building site may need to be engraved with signage or other information, and the retaining wall is permanently affixed in place. Moreover, the retaining wall is in a permanent vertical orientation.

Thus, it would be advantageous to provide a portable rail and frame system to support a CNC router for engraving hard materials in situ, and particularly one that enables engraving to be performed on vertical surfaces in situ.

SUMMARY

In a first aspect, embodiments are disclosed of a portable rail system for mounting an engraving device used for engraving hard materials in situ, the rail system comprising two rail lengths, each rail length having a first end and a second end, at least two crossbars positioned, in use, to each extend between the two rail lengths to position the two rail lengths in parallel spaced arrangement relative to each other, each said crossbar having a first end and a second end, and locating pins positioned on at least two of said first end or said second end of either said two rail lengths or said at least two crossbars, the locating pins being received within correspondingly positioned bores formed through at least two of said first end or said second end of either said two rail lengths or said at least two crossbars.

In certain embodiments, the two rail lengths are each formed with a mounting rail positioned along an upper surface of each said rail length for slidingly receiving a gantry thereon.

In other certain embodiments, the two rail lengths are each formed with a metering device positioned to engage a gantry mounted on said mounting rail of each of the two rail lengths, the metering device providing measured movement of the gantry along the two rail lengths.

In yet another embodiment, the locating pins further comprise two upstanding pins, and said first end and said second end of each said crossbar is structured with two locating pins.

In still another embodiment, the first end and the second end of each of the two rails is formed with two bores positioned to receive therein the locating pins positioned on the first end and second end of the corresponding crossbar.

In other embodiments, the rail system further comprises a locking member positioned in proximity to the locating pins to secure the two rail lengths to the at least two crossbars when the locating pins are received in the corresponding bores.

In certain embodiments, the rail system further comprises a height adjustment device positioned in proximity to the locating pins for providing adjustment of the two rail lengths and the at least two crossbars relative to a contact surface.

In some embodiments, the at least two crossbars are each configured with a contact surface-engaging device for selectively engaging the portable rail system to a contact surface.

In other embodiments, the contact surface-engaging device further comprises one or more suction members.

In a second aspect, a method for assembling a portable rail system for an engraving device used for engraving hard materials in situ, comprises providing a modular rail system comprising two rail lengths, each rail length having a first end and a second end, at least two crossbars positioned, in use, to each extend between the two rail lengths to position the two rail lengths in parallel spaced arrangement relative to each other, each said crossbar having a first end and a second end, and locating pins positioned on at least two of said first end or said second end of either said two rail lengths or said at least two crossbars, the locating pins being received within correspondingly positioned bores formed through at least two of said first end or said second end of either said two rail lengths or said at least two crossbars; arranging the two rail lengths spaced apart from each other and generally parallel to each other; arranging the at least two crossbars to extend between the two rail lengths and positioning the first end and second end of each crossbar to align with a first end or second end of the two rail lengths to form a frame; inserting the locating pins into the corresponding bores to snugly engage the crossbars to the two rail lengths, and securing the at least two crossbars to the two rail lengths by locking members located in proximity to the locating pins.

In a third aspect, a kit assembly for providing a portable engraving system used for engraving hard materials in situ comprises a set of at least two rail lengths, each having a mounting rail for slidably receiving a gantry that is configured to support an engraving device; a set of at least two crossbars structured to engage a set of two rails for providing a frame when assembled; a gantry; a CNC router; an electronics assembly for connection to a CNC router, the electronics assembly including a data storage device and cabling to interconnect the CNC router to the data storage device, and an outer box for containing the foregoing components.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE FIGURES

The accompanying drawings facilitate an understanding of the various embodiments:

FIG. 2A is a perspective view of an end portion of a crossbar in accordance with the disclosure;

FIG. 4A is a perspective view of the top of an end of a crossbar that registers with the rail length shown in FIG. 4;

FIG. 14 is a view of the container and additional case, positionable within the container, for housing data storage elements.

DETAILED DESCRIPTION

Figure 1:
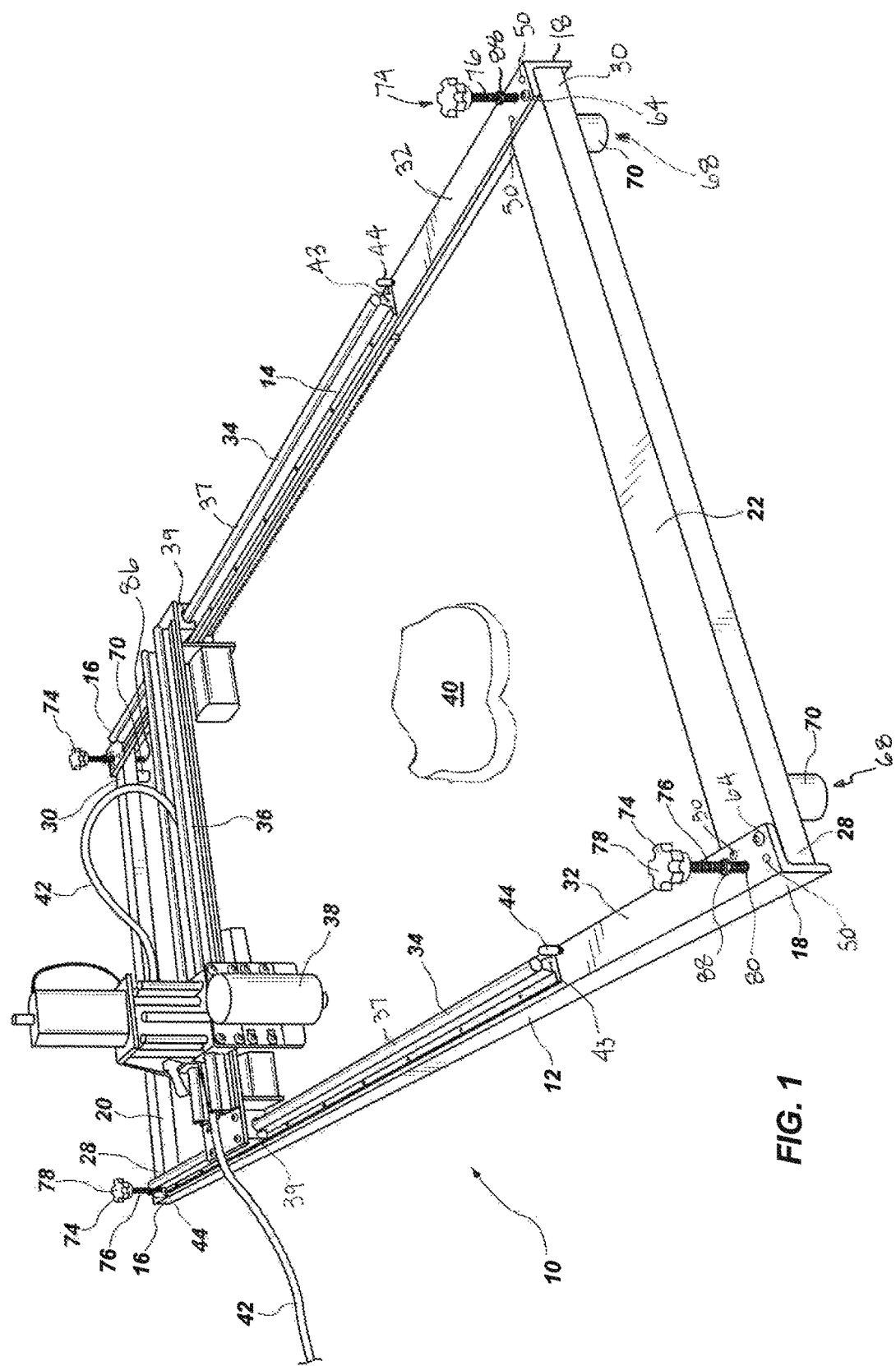
FIG. 1 is perspective view of the portable rail system and frame of the present disclosure.

FIG. 1 shows a view of a portable rail system 10, or frame 10, in accordance with the present disclosure. The portable rail system 10 comprises two rail lengths 12, 14, each rail length 12, 14 having a first end 16 and a second end 18. The portable rail system 10 further comprises at least two crossbars 20, 22 which, in use, are positioned to each extend between the two rail lengths 12, 14 to position the two rail lengths 12, 14 in parallel spaced apart arrangement relative to each other. While two crossbars 20, 22 are shown, more crossbars may be employed. Each crossbar has a first end 28 and a second end 30 which align with and are, in use, secured to the first end 16 and second end 18, respectively, of the corresponding two rail lengths 12, 14, as shown. Specifically, the first end 28 of each crossbar 20, 22 is engaged with the first rail length 12 and the second end 30 of each crossbar 20, 22 is engaged with the second rail length 14. The crossbars, 20, 22 are, in use, spaced apart from each other along the length dimension of the rail lengths 12, 14.

Figure 2:
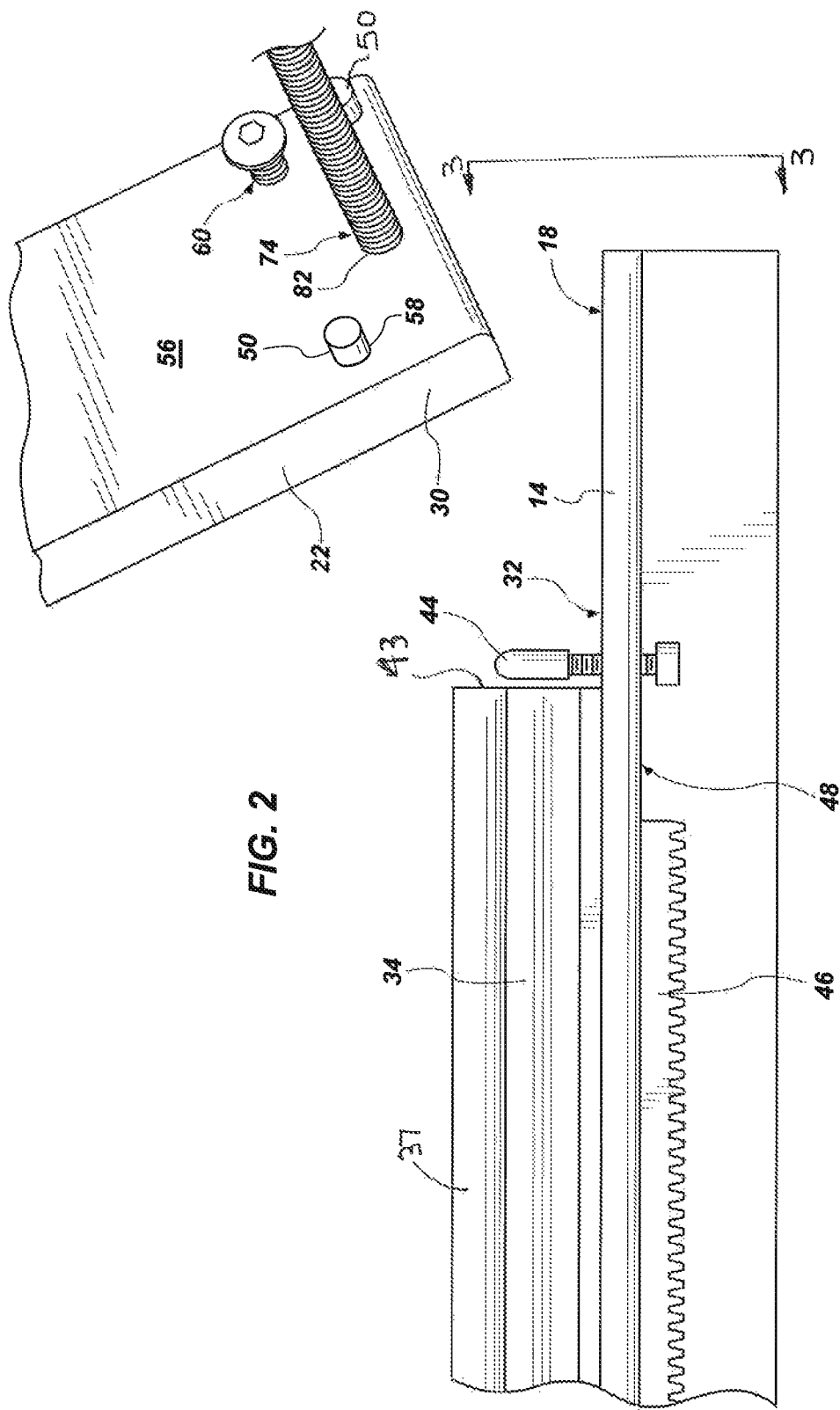
FIG. 2 is an enlarged side view in elevation of a portion of a rail length of the present portable rail system.
Figure 3:
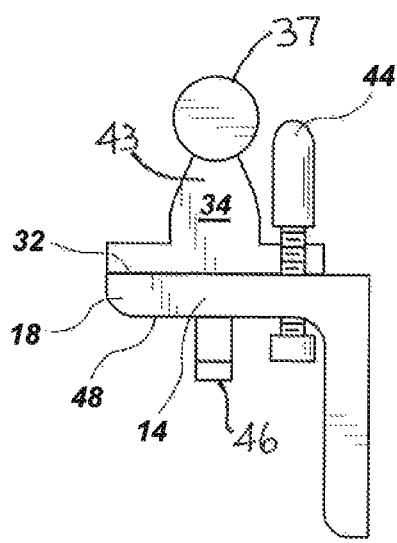
FIG. 3 is an end view in elevation of the rail length shown in FIG. 2, taken at line 3-3.

As shown in FIGS. 1-5, each of the two rail lengths 12, 14 may be formed from a length of angle material that is formed with an L-shape when viewed in lateral cross section through the long axis of the rail length, as depicted in FIG. 3. Each rail length 12, 14 is provided with an upper surface 32 along one length of the L-shaped rail that, in use, is oriented away from a contact surface against which the rail system 10 is ultimately positioned, such as a wall. A mounting rail 34 is positioned along all or a portion of the length of the upper surface 32 of each the rail lengths 12, 14.

As shown in FIG. 1, the mounting rail 34 positioned on each rail length 12, 14 provides, in tandem, a track onto which a gantry 36 is slidably received. Each mounting rail 34 may, for example, be structured with an elongated tubular-shaped member 37 along which a correspondingly shaped gantry sleeve 39 is slidingly received.

A CNC router 38 is attached to the gantry 36 so that the CNC router 38 is positioned above a work surface 40 (only partially depicted), typically comprising a hard material, such as stone, cement, wood, glass, plastic, etc. Electronic cabling 42 is attached to the CNC router 38, positioned on the gantry 36, and the cabling 42 is also connected to a data storage device 41, such as a computer (see FIG. 13). The data storage 41 device sends signals to the CNC router 38 and sends signals to the gantry 36, which causes the gantry 36 to slidably move along the length of the mounting rails 34 and which also causes the CNC router 38 to move back and forth along the gantry 36 in the distance formed between the two rail lengths 12, 14.

Figure 4:
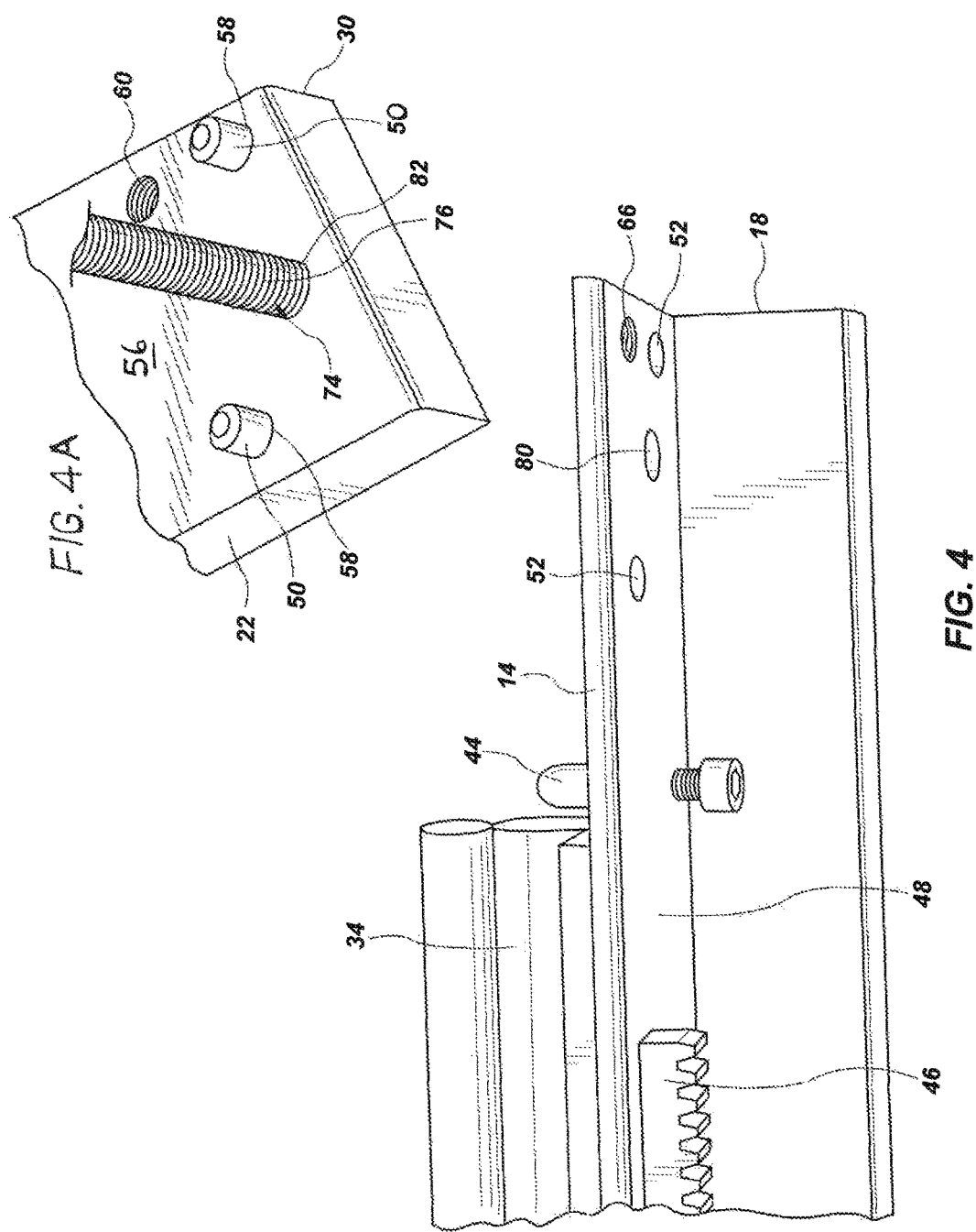
FIG. 4 is a view of the portion of rail length shown in FIG. 2, positioned at an angle to view the underside of the rail length.
Figure 5:
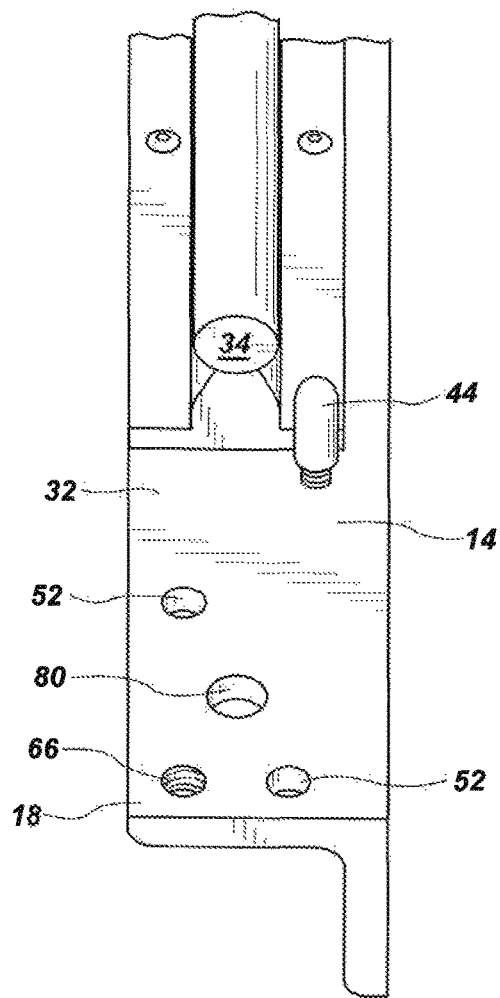
FIG. 5 is a perspective view of the portion of rail length shown in FIG. 2, positioned to show the upper surface of the rail length.

As seen in FIGS. 1-5, a stop mechanism 44 is positioned at the ends 43 of each mounting rail 34 to prevent the gantry 36 from sliding beyond the end 43 of the mounting rails 34. As also seen in FIGS. 2 and 4, a metering device 45, in the form of a ratcheting strip 46, is positioned along a lower surface 48 of each rail length 12, 14 to aid in the incrementally measured movement of the gantry 36 along the length of the mounting rails 34, as dictated by the data received from the data storage device 41. The gantry 36 is engaged with the metering device 45 in a manner that enables the gantry 36 to move along the metering device 45 on each rail length 12, 14.

The portable rail system 10 of the present disclosure has the advantage of being capable of assembly and disassembly, thereby enabling the use of CNC router engraving systems in situ, or on-site, rather than in a workshop. It also has the advantage of enabling the use of CNC router devices on vertical surfaces.

Configuring a rail system to be portable to achieve these advantages presents certain difficulties. In particular, the portable frame or rail system must be precisely assembled using structural arrangements that assure proper alignment of the component parts to each other and to assure proper leveling of the CNC router relative to the work surface, especially for vertical orientations. If not accurately assembled for security and proper alignment, the router can be improperly positioned relative to the contact or work surface, which results in uneven engraving of the work surface.

The present structure of the disclosure provides comprehensive alignment and secure fitting of the component elements of the portable rail system 10 for a CNC router. As shown in the various figures, the first end 16 and second end 18 of each rail length 12, 14 is aligned with and secured to the corresponding first end 28 and second end 30 of the crossbars 20, 22 by use of locating pins 50, as seen in FIGS. 2, 4 and 6-11. The locating pins 50 are positioned to be received in corresponding bores 52.

Generally, the locating pins 50 may be positioned on at least two of the first end 16 and/or said second end 18 of the two rail lengths 12, 14 or the locating pins 50 may be positioned on the first end 28 and/or second end 30 of the at least two crossbars 20, 22. As illustrated in the embodiments shown in FIGS. 2 and 4, upstanding locating pins 50 are positioned on an upper surface 56 of the crossbar 22, and corresponding bores 52 are located in or through the second end 18 of the rail length 14. As seen in FIG. 4, for example, when the upper surface 56 of the second end 30 of the crossbar 22 is positioned correctly against the lower or under surface 48 of rail length 14, the locating pins 52 align with the bores 52 and the locating pins are received in the corresponding bores 52. The locating pins 50, in other embodiments, can be positioned, for example, to extend downwardly from the lower surface 48 of the rail lengths 12, 14 and the corresponding bores 52 to receive the locating pins 50 may be formed in the upper surface 56 of the crossbars 20, 22. Other combinations are within the scope of the disclosure.

In the embodiment shown in the figures, two locating pins 50 are secured to each of the first end 28 and second end 30 of each crossbar 20, 22 and align with bores 52 that are formed through the thickness of the rail lengths 12, 14 at both the first end 16 and second end 18 of the rail lengths 12, 14. The locating pins 50 are offset at an angle relative to each other, and the bores 52 formed in the rail lengths 12, 14 are correspondingly offset. It should be noted that the precise placement of the locating pins 50 and the bores 52 enables any corresponding end of a rail length to be fitted to an end of a crossbar, making the rail lengths and crossbars variably adaptable in assembly to one another.

The locating pins 50 may be formed from a variety of materials, but are particularly suitable when made of hardened steel. The dimensions of the locating pins 50 may be modified and varied, but are particularly suitable when having a diameter of one quarter inch and a length of one and one quarter inches. In the illustrated embodiment, blind bores 58 are formed in the upper surface 56 of the crossbar 20, 22 and each locating pin 50 is fitted into the blind bore 58, being secured therein by friction fit.

Figure 6:
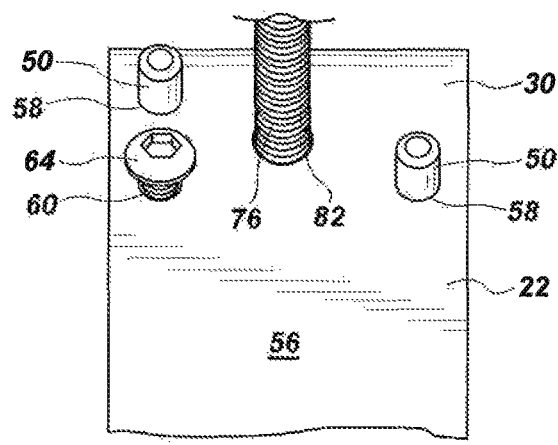
FIG. 6 is an enlarged view of one end of a crossbar which, when oriented ninety degrees to the left from the view shown, is arranged to engage with the end portion of the rail shown in FIG. 5.
Figure 7:
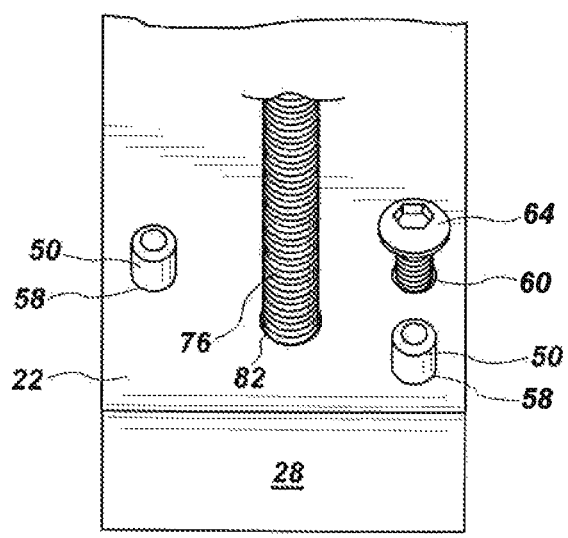
FIG. 7 is a view of the end of the crossbar shown in FIG. 6, rotated to view the outer end of the crossbar.
Figure 10:
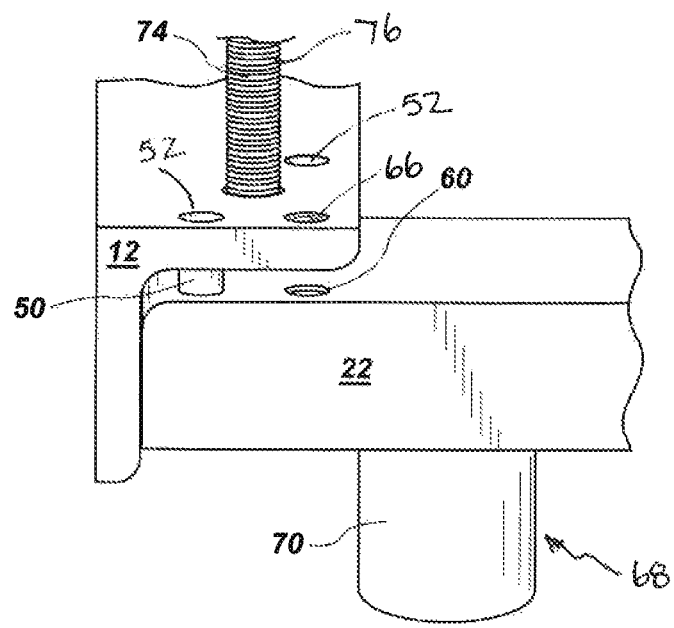
FIG. 10 is a side view of the end of the rail length and the crossbar shown in FIG. 9 in an assembled arrangement.

The rail system 10 of the present disclosure is further provided with locking members for securing the rail lengths 12, 14 to the crossbars 20, 22. As shown in FIGS. 4 and 4A, a second blind threaded bore 60 is formed in the upper surface 56 of the crossbar 20, 22 into which is received a threaded screw 64 (FIGS. 1, 2, 6), which is also threadingly received in a corresponding threaded aperture 66 formed through the rail length 12, 14 in proximity to the locating pin 50 positions. Thus, when the end of a rail length 12, 14 is positioned to align the bores 52 with corresponding locating pins 50 set in an end of a crossbar 20, 22, and the locating pins 50 are received snugly within the bores 52, the threaded screw 64 is positioned through the threaded aperture 66 and is turned to engage with the threaded blind bore 60 of the crossbar 20, 22, thereby securing the rail length 12, 14 and the crossbar 20, 22 together, as shown in FIG. 1. Notably, FIGS. 2A, 6 and 7 show the threaded screw 64 in place within the threaded bore 60 of the crossbar 20, 22 (i.e., with the rail length 12, 14 removed), but it is to be understood that when the frame 10 is fully assembled, the threaded screw 64 passes through the threaded aperture 66 in the rail length 12, 14 so that the head of the threaded screw 64 is positioned at the upper surface 32 of the rail length 12, 14 for access, as depicted in FIG. 1. In FIG. 10, the threaded screw 64 is absent from its placement between the rail length 12 and crossbar 22 for ease of viewing. In use, however, the threaded screw 64 would be in place as described.

Figure 8:
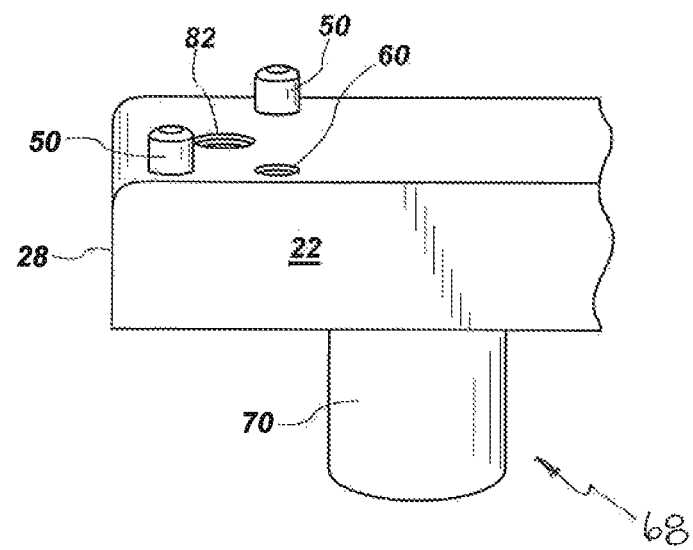
FIG. 8 is a side view of the end of the crossbar shown in FIG. 7.
Figure 9:
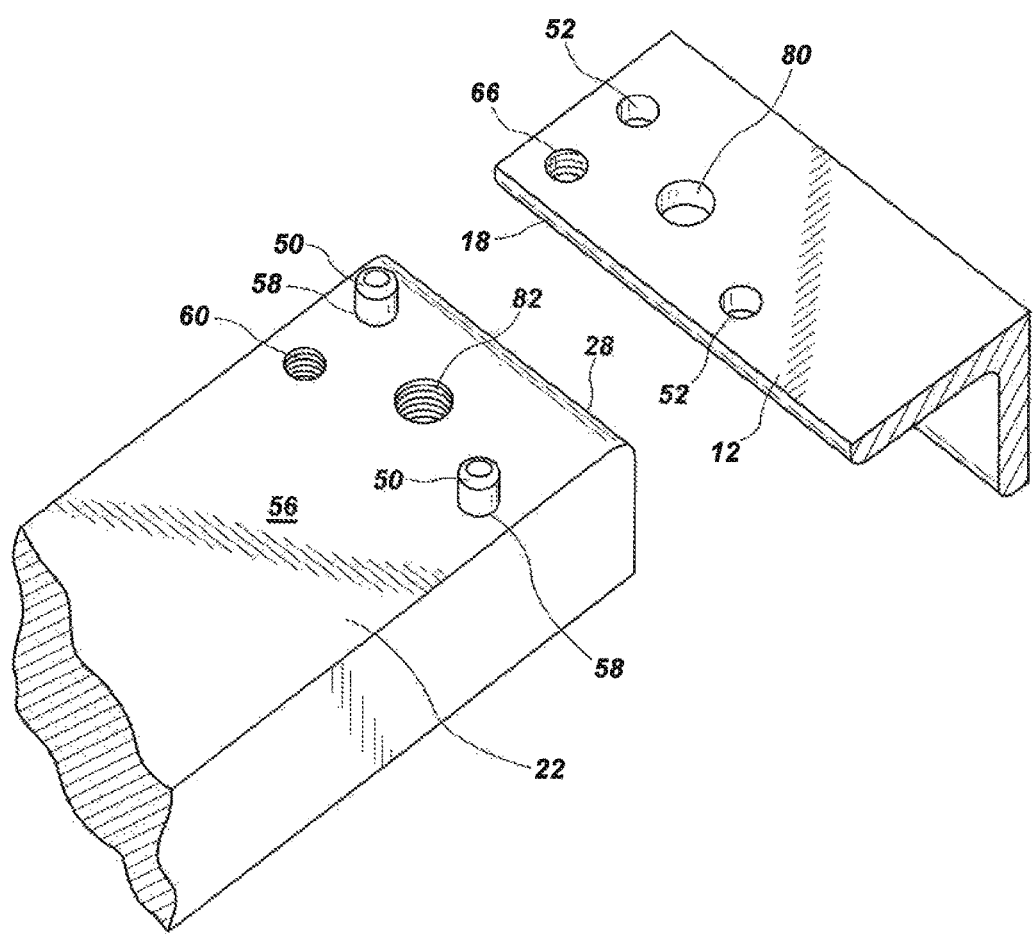
FIG. 9 is a view a portion of a rail length and a crossbar illustrating alignment of locating pins to bores.
Figure 11:
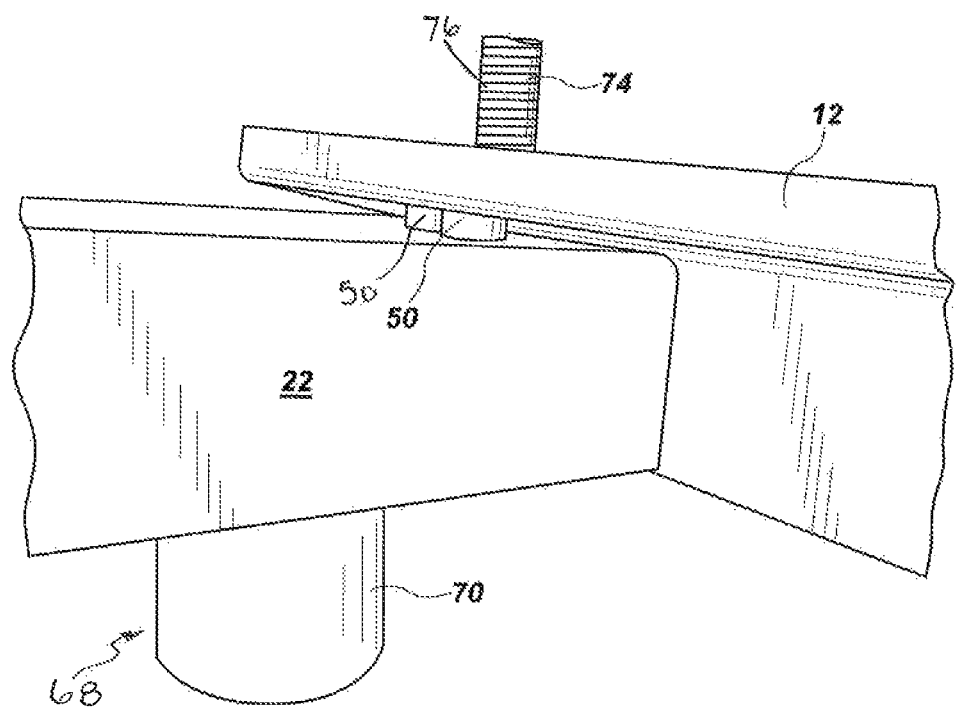
FIG. 11 is a perspective view of the engaged rail length and crossbar shown in FIG. 10, oriented at a 45 degree angle from the view of FIG. 10.

As further seen in FIGS. 1, 8 and 11, the lower surface of the crossbars 20, 22, particularly at the first end 28 and second end 30, may be provided with contact surface-engaging devices 68, such as one or more suction members 70 which are oriented for positioning on or against a work surface or contact surface, such as a hardened surface or wall. The suction members 70, of which there may be a plurality, adhere the rail system 10 to the work surface or contact surface.

The rail system 10 is further provided with an adjustment device 74 at each portion of the rail system 10 where the first end 16 or second end 18 of a rail length 12, 14 engages the corresponding first end 28 or second end 30 of a crossbar 20, 22. In the embodiments shown, the adjustment device 74 comprises a threaded shank 76 having a handle 78, the threaded shank 76 being threadingly received through a first threaded aperture 80 formed through the rail length 12, 14 and a second threaded aperture 82 formed through the thickness of the crossbar 20, 22 so that the end 86 (FIG. 1) of the threaded shank 76 is positioned to contact the work surface or contact surface on which the rail system is positioned. By turning the handle 78 of the adjustment device 74, fine adjustments can be made to adjust the height position of the rail system 10 relative to the work surface or contact surface as may be necessary to compensate for irregularities in the work surface.

The adjustment devices 74 may be structured with a securement member 88, such as a rotatable nut received on the threaded shank 76, which can be rotated to engaged with the upper surface 32 of the rail length 12, 14 once the adjustment devices 74 have been moved to properly calibrate the rail system 10 relative to the work surface or contact surface 40. The securement member 88 not only locks the adjustment device 74 in place, but can provide additional fine tuning with respect to the rotation of the threaded shank 76 to properly calibrate or level the frame 10.

Figure 12:
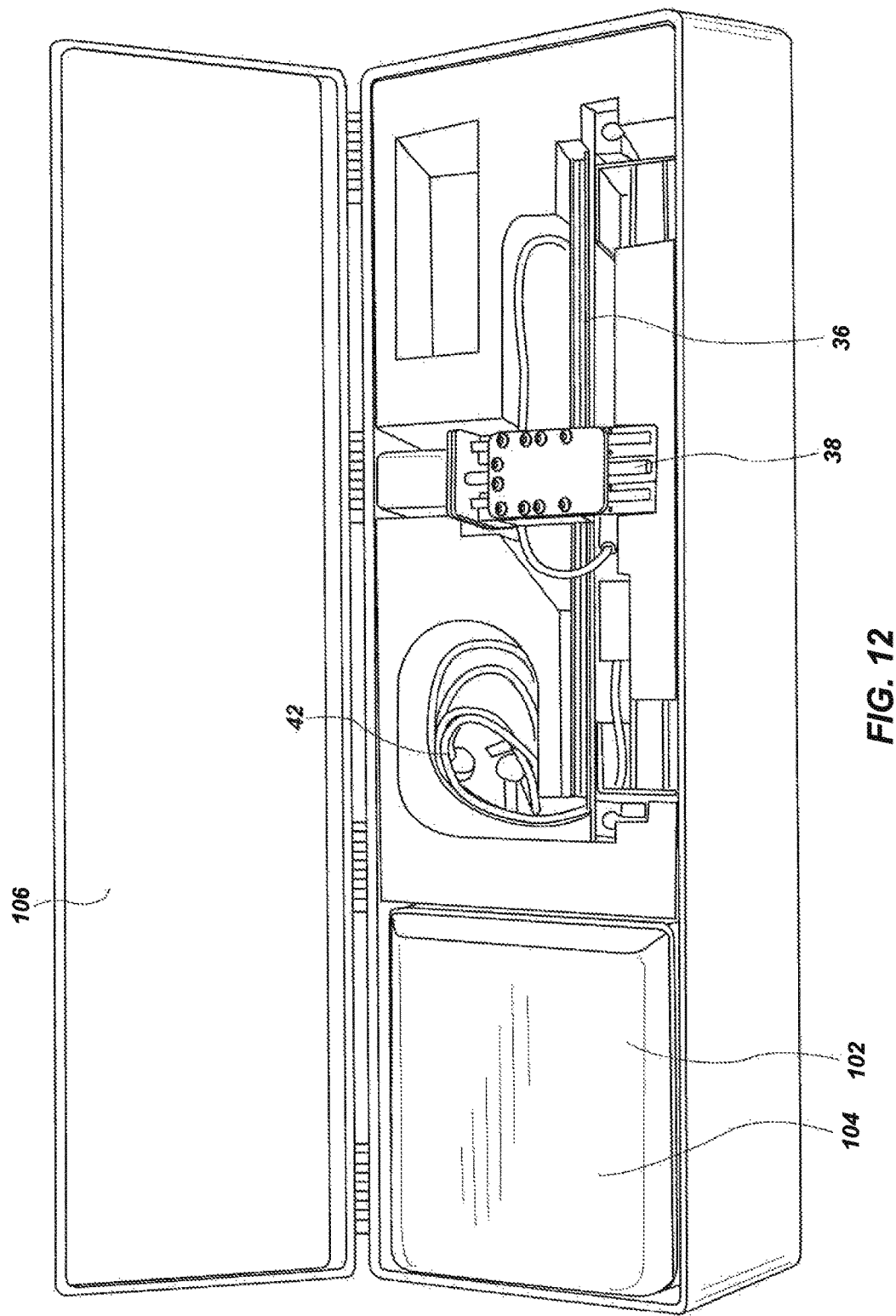
FIG. 12 is a plan view of an open case structured to contain components of a CNC router and rail system in accordance with the disclosure.
Figure 13:
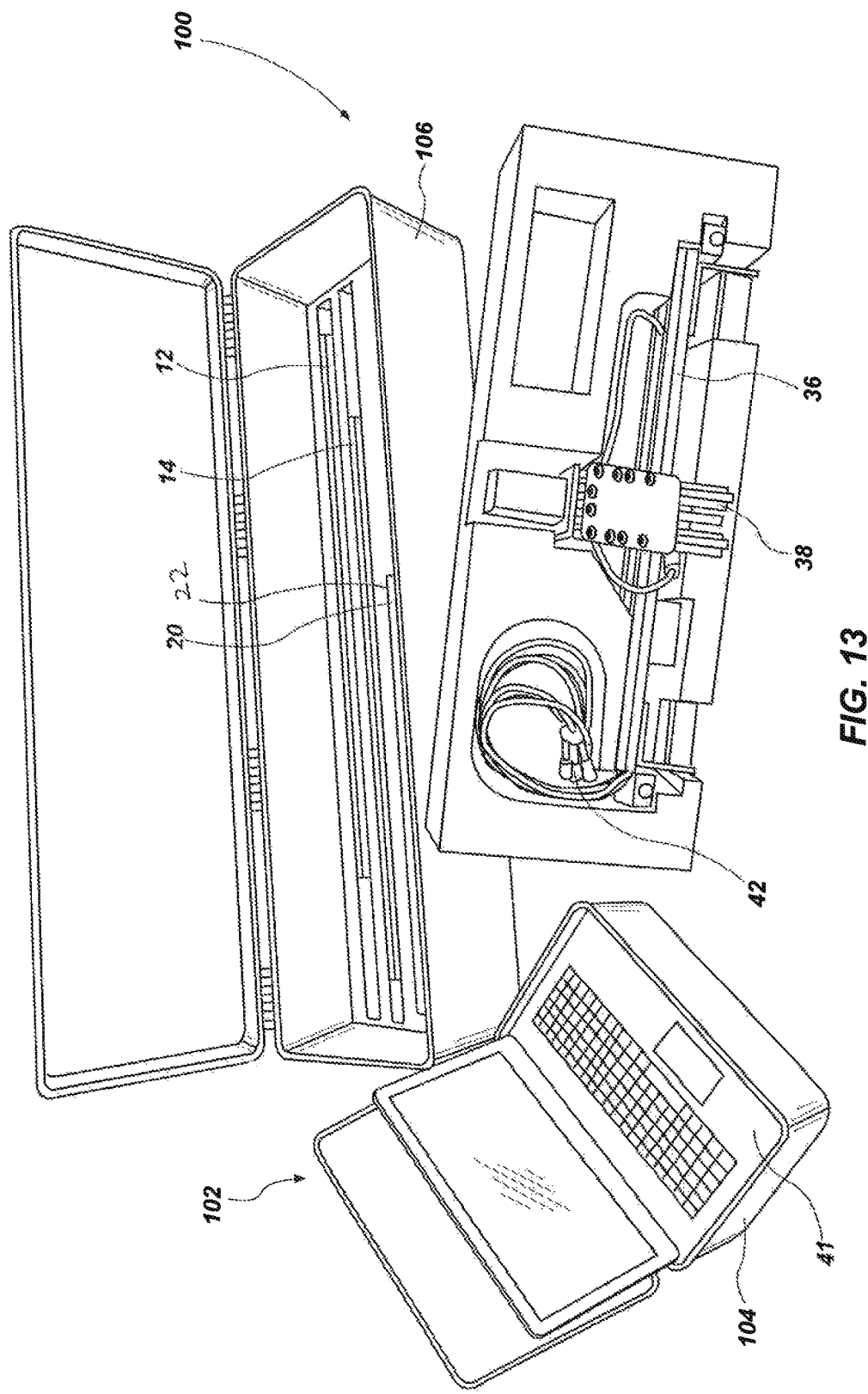
FIG. 13 is a perspective view of portions of the container housing the components of the CNC router and rail system.

In a further aspect of the disclosure, a kit assembly 100, as shown in FIGS. 12-14, may be provided to portably house a portable rail system and engraving system used for engraving hard materials in situ. The kit assembly 100 comprises a set of at least two rail lengths 12, 14, each having a mounting rail for slidably receiving a gantry 36 that is configured to support an engraving device, and a set of at least two crossbars 20, 22 structured to engage a set of two rails 12, 14 for providing a frame when assembled. The kit assembly 100 further includes a gantry 36 and a CNC router 38, as well as an electronics assembly 102 for connection to the CNC router 38. The electronics assembly 102 includes a data storage device 41 and cabling 42 to interconnect the CNC router 38 to the data storage device 41, which may be received within an inner container 104. An outer box 106 is provided for containing all of the foregoing enumerated components.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, inventions have been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the inventions. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A portable rail system for mounting an engraving device used for engraving hard materials in situ, comprising:
   two rail lengths, each rail length having a first end and a second end;
   at least two crossbars positioned, in use, to each extend between the two rail lengths to position the two rail lengths in parallel spaced apart arrangement relative to each other, each said crossbar having a first end and a second end; and
   locating pins positioned at said first end and/or said second end of either said two rail lengths or said at least two crossbars, the locating pins being received within correspondingly positioned bores formed through at least two of said first end or said second end of either said two rail lengths or said at least two crossbars.

2. The portable rail system of claim 1, wherein said two rail lengths are each formed with a mounting rail positioned along an upper surface of each of said two rail length for slidingly receiving a gantry thereon.

3. The portable rail system of claim 2, wherein said two rail lengths are each formed with a metering device positioned to engage a gantry mounted on said mounting rail of each of said two rail lengths, the metering device providing measured incremental movement of the gantry along said two rail lengths.

4. The portable rail system of claim 1, wherein the locating pins further comprise two upstanding pins, and wherein said first end and said second end of each said crossbar is structured with two locating pins.

5. The portable rail system of claim 4, wherein the first end and said second end of each of said two rails is formed with two said bores positioned to receive therein the locating pins positioned on the first end and second end of said corresponding crossbar.

6. The portable rail system of claim 1, further comprising a locking member positioned in proximity to said locating pins to secure said two rail lengths to said at least two crossbars when said locating pins are received in said corresponding bores.

7. The portable rail system of claim 1, further comprising a height adjustment device positioned in proximity to said locating pins for providing adjustment of said two rail lengths and at least two crossbars relative to a contact surface.

8. The portable rail system of claim 7, wherein each said height adjustment device further includes a securement member to secure the height adjustment device at a selected height.

9. The portable rail system of claim 1, wherein said at least two crossbars are each configured with a contact surface-engaging device for selectively engaging the portable rail system to a contact surface.

10. The portable rail system of claim 9, wherein said contact surface-engaging device further comprises one or more suction members.

11. The portable rail system of claim 2, further including a gantry slidingly received on and between said mounting rails of said two rail lengths.

12. The portable rail system of claim 11, further including an engraving apparatus positioned on and movable along said gantry.

13. The portable rail system of claim 12, further including a data storage device in electronic communication with said engraving apparatus.

14. A method for assembling a portable rail system for an engraving device used for engraving hard materials in situ, comprising:
   providing a modular rail system comprising two rail lengths, each rail length having a first end and a second end, at least two crossbars positioned, in use, to each extend between the two rail lengths to position the two rail lengths in parallel spaced apart arrangement relative to each other, each said crossbar having a first end and a second end, and locating pins positioned at said first end or said second end of either of said two rail lengths or at said at least two crossbars, the locating pins being received within correspondingly positioned bores formed through at least two of said first end or said second end of either said two rail lengths or said at least two crossbars;
   arranging the two rail lengths spaced apart from each other and generally parallel to each other;
   arranging the at least two crossbars to extend between the two rail lengths and positioning the first end and second end of each crossbar to align with a first end or second end of the two rail lengths to form a frame;
   inserting the locating pins into the corresponding bores to snugly engage the crossbars to the two rail lengths; and
   securing the at least two crossbars to the two rail lengths by locking members located in proximity to the locating pins.

15. The method according to claim 14, further comprising inserting height adjustment devices through said two rail lengths and/or through said at least two crossbars.

16. The method according to claim 15, wherein said two rail lengths each have a mounting rail connected thereto, and further comprising attaching a gantry to slidingly engage with said mounting rails.

17. The method according to claim 16, further comprising attaching an engraving apparatus to said gantry in sliding engagement therewith.

18. The method according to claim 17, further comprising placing a data storage device in electronic communication with the engraving apparatus and the gantry.

* * * * *